United States Patent Office 3,557,170
Patented Jan. 19, 1971

3,557,170
DESTRUCTION OF CYCLOPROPENE MOIETIES IN VEGETABLE OILS WITH PALLADIUM COMPOUNDS AND CATALYSTS
Reuben O. Feuge and Zigrida M. Zarins, New Orleans, La., assignors to the United States of America as represented by the Secretary of Agriculture
No Drawing. Filed Jan. 15, 1969, Ser. No. 791,515
Int. Cl. C09f 5/10
U.S. Cl. 260—420         4 Claims

ABSTRACT OF THE DISCLOSURE

This invention relates to a process for destroying the cyclopropene moiety in refined cottonseed oil and in other fatty acid esters containing the cyclopropene moiety. More particularly, this invention relates to a process whereby palladium compounds in the absence of hydrogen destroy the cyclopropene moiety present in refined cottonseed oil and other fatty acid esters including kapok seed oil and the seed oil of *Hibiscus syriacus.*

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for destroying the cyclopropene moiety and for eliminating the Halphen-test response from refined cottonseed oil and from other fatty acid esters when the cyclopropene moiety is present. This invention has as its objective the production of cottonseed oils and other fatty acid esters that react negatively to the Halphen test, one of the standard tests for determining the presence of cyclopropenes.

Cottonseed oil contains the cyclopropene acids malvalic and sterculic at a level which usually ranges from 0.5% to about 1.0%. Because both acids are physiologically active, their presence in cottonseed oil has been of considerable interest even though the amounts present are quite small. As might be expected, the cyclopropene moiety is chemically quite reactive. It will react with itself at high temperatures and it will react with organic and inorganic acids. The cyclopropene moiety hydrogenates readily and a number of papers on the hydrogenation of the esters of the cyclopropene acids have been published.

Prior art processes to eliminate the Halphen-test response in cottonseed oil exist. Prolonged heating of cottonseed oil in the presence of air has been reported to eliminate the response to the Halphen-test. Treatment with practically any organic or mineral acid is also known to effect a reduction in or the destruction of the Halphen-test response. Rayner et al. (U.S. Patents 3,326,947 and 3,347,886) have removed the Halphen-test response from refined cottonseed oil by heating the oil in the presence of monobasic fatty acids of vegetable origin or with added free fatty acids.

It is known that acids containing the cyclopropene ring, i.e., malvalic and sterculic, when included in the ration of laying hens are capable of producing certain abnormalities, such as pink egg whites, salmon colored, enlarged fluid yolks, and reduced hatchability [R. A. Phelps, F. S. Shenstone, A. R. Kemmerer, and R. J. Evans, Poultry Science, 44, 358–394 (1965)]. In addition, it has been reported that a correlation exists between the intensity of the Halphen test as applied to the residual oil in the cottonseed meal component of a poultry ration and the occurrence of abnormalities in stored intact eggs. Another important physiological effect is the change in the ratio of stearic to oleic acids in the depot fats of animals fed cyclopropene acid-containing fats. This change is brought about because the cyclopropenes affect the metabolism of fatty acids.

The possibility that hydrogenation catalysts in the absence of hydrogen might alter the cyclopropene moiety of the cyclopropene fatty acids or their esters apparently has never been investigated. In preliminary tests with a number of hydrogenation catalysts, the discovery was made that some catalysts could be made to destroy the cyclopropene moiety. The experiments then were extended with the thought that treating cottonseed oil with such caalysts might be a suiable technique for producing a cyclopropene-free oil.

To esablish the relative cyclopropene destroying activity of the catalysts ordinarily available in the laboratory for the hydrogenation of double bonds, a series of tests was made with a commercially refined and bleached cottonseed oil containing 0.73% cyclopropenes, calculated as trimalvalin. The oil and the selected catalyst were mixed in the reaction vessel and the catalyst was kept in suspension by bubbling dry nitrogen through the mixture. All air was excluded. The reaction vessel with the suspension of catalyst in oil was immersed for two hours in an oil bath at 150° C. At the end of the heating period the mixture was cooled and the catalyst was removed by filtration. The treated oil was then subjected to the Halphen test of the American Oil Chemists' Society, Official Method Cb 1–25, which gives a red color or positive reaction when cyclopropenes are present at a level about 0.01%.

The palladium containing catalyst in the form of 10% palladium on carbon was the only one which completely destroyed the cyclopropenes in this series of tests. It was effective at a concentration of only 0.02%. To establish that the palladium metal rather than the catalyst support was the active component, tests were made with activated carbon. The latter did not destroy cyclopropenes as determined by the Halphen test.

Similar experiment were run with various forms of palladium. A 10% palladium-on-silica catalyst was prepared in the laboratory and tested, 0.03% palladium was required to give a negative test. Tests with $PdCl_2$, $Pd(NO_3)_2$, and Pd black were made at a level of 0.1% Pd. Results of these experiments are shown in Table I.

TABLE I.—RESULTS OF HALPHEN TEST AFTER REACTING CYCLOPROPENES WITH A PALLADIUM CATALYST

| Palladium catalyst | Halphen test | Temperature, °C. | Time, hours |
|---|---|---|---|
| 0.01% Pd | Positive | 150 | 2 |
| 0.02% Pd | Negative | 150 | 2 |
| 0.03% Pd | do | 150 | 2 |
| 0.10% $PdCl_2$ | do | 150 | 2 |
| 0.10% $Pd(NO_3)_2$ | do | 150 | 2 |
| 0.10% Pd. black | Slightly positive | 150 | 2 |
| Control | Positive | 150 | 2 |

The palladium compounds employed generally were completely free of adsorbed hydrogen. Even a freshly prepared palladium-on-carbon catalyst, however, would not have contained sufficient hydrogen to have destroyed even 1% of the cyclopropenes which were destroyed. The $PdCl_2$ and the $Pd(NO_3)_2$ of course contained no hydrogen. The Pd catalysts could be reused for the destruction of cyclopropenes. However, some catalyst poisoning occurred during the destruction of the cyclopropenes and the catalyst had to be regenerated by washing it with a solution of an alkali (sodium hydroxide) in alcohol. The activity of the washed catalyst was not quite as good as that of the original catalyst.

These palladium compounds had no effect whatsoever on the other fatty acid groups. However, PdCl$_2$ is known to cause some isomerization in unsaturated compounds of much lower molecular weight.

An indication of the rate at which cyclopropenes are destroyed was gained by a series of tests conducted with purified methyl esters of *Sterculia foetida* oil fatty acids. These methyl esters which contained 58.4% cyclopropenes, calculated as methyl sterculate, were mixed with 0.5% palladium in the form of palladium-on-carbon catalyst and portions of the suspension were heated under nitrogen for varying periods of time at 150° C. The treated samples were analyzed for cyclopropene content using an infrared spectrophotometric method. After 30 minutes of heating, 62% of the cyclopropene acid groups were destroyed, after 40 minutes, 97% were destroyed and after 90 minutes, all traces of cyclopropene had disappeared.

Outwardly, the properties of cottonseed oil did not change on being rendered Halphen negative by treatment with palladium catalysts. The oil still retained its characteristic color and bland flavor. There was no noticeable change is viscosity. Infrared spectra of the oil before and after treatment were identical with the exception that sometimes a barely detectable band appeared at 10.3 microns after treatment. This band indicates the presence of a small proportion of trans bonds. Because the original concentration of cyclopropenes in the cottonseed oil was only 0.73%, one would not expect much change after treatment.

In order to establish the nature of the reaction products, pure methyl sterculate was heated with 0.5% palladium (as 10% palladium-on-carbon catalyst) at 150° C. for 2 hours to destroy the cyclopropene groups. Thin-layer chromatography (TLC) indicated a content of about 50% polymer. Gas liquid chromatographic (GLC) analysis of the reaction products revealed that at least five compounds of about the same molecular weight as methyl sterculate were formed. These findings indicate that the treatment of methyl sterculate with palladium results in a catalytic cleavage of the cyclopropene ring to produce methyl and/or methylene substituted fatty acid groups which may undergo further polymerization reactions. It is believed that the main structures resulting from the cleavage of the cyclopropene ring are shown in the following formulae:

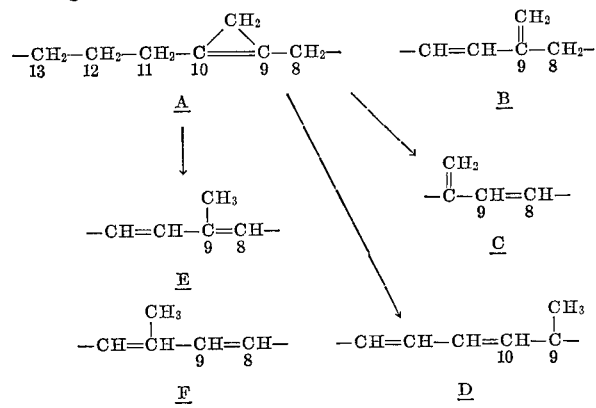

Structures B and C probably represent over 50% of the reaction products. Structures E and F represent the next largest portion. Small proportions of structures other than those shown are undoubtedly produced. However, very little cleavage of the hydrocarbon chain is produced.

EXAMPLE 1

To determine the minimum amount of palladium (in the form of 10% palladium-on-carbon) required to produce a cyclopropene free oil, commercially refined and bleached cottonseed oil containing 0.73% cyclopropenes (calculated as trimalvalin) was used.

Three 20 g. samples of the oil were weighed in 10 cm. by 2.5 cm. test tubes. To the first tube 0.04 g. of finely divided 10% palladium-on-carbon was added (equivalent to 0.02% Pd), to the second and the third tube 0.02 g. of finely divided 10% of palladium-on-carbon was added (equivalent to 0.01% Pd). The tubes were corked with two-hole stoppers and through one of the holes capillary glass tubing was inserted. A steady stream of nitrogen was bubbled through the mixtures to keep the catalyst in suspension. The tubes were then placed in an oil bath at 150° C. The first two tubes were removed after two hours, the third after three. The tubes were immediately placed in an ice bath, nitrogen was bubbled through it until the mixtures cooled. The catalyst was then filtered off. The Halphen test was used to test the treated oils for the presence of cyclopropene groups. The first oil gave a negative Halphen test response, the second and the third a slightly positive test, indicating a content of less than 0.05% cyclopropene fatty acid groups. The two oil samples heated with 0.01% of finely divided Pd showed about the same response to the Halphen test. The experiment was repeated at 200° C. The results obtained by heating the oil samples at 200° C. were about the same as those obtained at 150° C.

Raising the temperature to 200° C. or extending the heating time did not result in any significant additional destruction of cyclopropenes.

The above-mentioned method was then used to determine the minimum amount of finely divided 10% palladium-on-silica catalyst required to produce a cyclopropene-free oil. Four samples of oil, 20 g. each, were weighed out and 0.08 g., 0.06 g., 0.04 g., and 0.02 g. of the finely divided catalyst was added to tubes 1 through 4 respectively. The mixtures were heated, as in the first experiment, at 150° C. for 2 hours. Oils from tubes 1 and 2 gave a negative Halphen test. Exactly the same procedure was followed using 0.1% of finely divided palladium in the form of palladium black, Pd(NO$_3$)$_2$. Table I shows the results on these experiments.

EXAMPLE 2

Methyl esters of *Sterculia foetida* oil fatty acids containing 58.4% cyclopropenes, calculated as methyl sterculate, were used for this experiment. Six samples, 6 g. each, of the esters were weighed into 12.5 cm. by 1.25 cm. test tubes, 0.3 g. of finely divided 10% palladium-on-carbon (equivalent to 0.5% Pd) was added to each tube. The tubes were corked with stoppers fitted with glass tubes to blow nitrogen through the mixtures. Nitrogen was bubbled through the mixtures to keep the catalyst in suspension. The test tubes were placed in an oil bath at 150° C. Tube 1 was removed after 20 minutes, tube 2 after 40 minutes, tube 3 after 60 minutes, tube 4 after 90 minutes, tube 5 after 120 minutes, and tube 6 after 180 minutes.

The amount of cyclopropenes destroyed during the different periods of heating was determined by infrared analysis. After 20 minutes of heating, 62% of the cyclopropene acid groups were destroyed, after 40 minutes 97% were destroyed, and after 90 minutes all traces of cyclopropene had disappeared.

EXAMPLE 3

To establish that palladium catalysts will destroy the cyclopropene moiety in cottonseed oil methyl esters, 12 g. of the methyl esters were weighed into a 10 cm. by 2.5 cm. test tube equipped with a 2-hole stopper, 0.36 g. of 10% Pd on C was added (equivalent to 0.3% palladium). The catalyst was kept in suspension by bubbling a steady stream of nitrogen through the mixture. The tube was placed in a 150° C. oil bath for three hours. At the end of this period the catalyst was filtered off. The treated esters gave a negative response to the Halphen test.

EXAMPLE 4

To determine if palladium catalysts will destroy the cyclopropene moiety in methyl esters of *Hibiscus syriacus* oil, 12 g. of the esters were weighed in a 2.5 cm. by 10 cm. test tube equipped with a two-hole cork stopper, 0.36 g. of 10% Pd on C (equivalent to 0.3% Pd) was added. A steady stream of nitrogen was bubbled through the mixture to keep the catalyst in suspension. The tube was placed in an oil bath at 150° C. and kept there for three hours. The catalyst was then filtered off. The treated esters were tested for the presence of cyclopropene groups with the Halphen test. The Halphen test response of the esters was negative.

EXAMPLE 5

To determine if palladium catalysts will destroy the cyclopropene moiety in *Lavatera trimesters* oil, 12 g. of the oil was weighed into a 2.5 cm. by 10 cm. test tube equipped with a two-hole cork stopper. 0.36 g. of 10% Pd on C was added. A steady stream of nitrogen was bubbled through the mixture to keep the catalyst in suspension. The tube was placed in an oil bath at 150° C. for three hours.

The catalyst was then filtered off. The treated oil was tested for the presence of cyclopropene groups by the Halphen test. The treated *Lavatera trimestris* oil gave a negative Halphen test response.

EXAMPLE 6

To determine if palladium catalysts will destroy the cyclopropene moiety in *Sterculia foetida* oil, 20 g. of the oil was weighed into a 2.5 cm. by 10 cm. test tube, 1 g. of 10% Pd on C was added (equivalent to 0.5% palladium). A steady stream of nitrogen was bubbled through the mixture to keep the catalyst in suspension. The tube was placed in an oil bath at 150° C. for three hours.

The catalyst was then filtered off. The treated *Sterculia foetida* oil gave a negative response to the Halphen test.

We claim:
1. A process for preparing cyclopropene-free natural vegetable oils which process comprises:
   (a) reacting the oil in a nitrogen atmosphere with about a 0.02 weight percent to about a 0.50 weight percent of a palladium compound selected from a group consisting of palladium chloride and palladium nitrate for a period of about 1 to 3 hours at a temperature of about 150 to 200° C.,
   (b) cooling the reaction mixture,
   (c) removing the palladium compound.
2. A process for preparing cyclopropene-free natural vegetable oils which process comprises:
   (a) reacting the oil in a nitrogen atmosphere with about a 0.02 weight percent to about a 0.50 weight percent of a palladium catalyst selected from a group consisting of palladium on carbon, palladium on silica and palladium black for a period of about 1 to 3 hours at a temperature of about 150 to 200° C.,
   (b) cooling the reaction mixture,
   (c) removing the palladium catalyst.
3. A process for preparing cyclopropene-free fatty acid esters derived from natural vegetable oils, which process comprises:
   (a) reacting the fatty acid methyl esters derived from an oil selected from the group consisting of *Sterculia foetida,* cottonseed, and *Hibiscus syriacus,* in a nitrogen atmosphere with about a 0.02 weight percent to about a 0.50 weight percent of a palladium compound selected from the group consisting of palladium chloride and palladium nitrate for a period of about from 1 to 3 hours at a temperature of about from 150° to 200° C.,
   (b) cooling the reaction mixture, and
   (c) removing the palladium compound.
4. A process for preparing cyclopropene-free fatty acid esters derived from natural vegetable oils, which process comprises:
   (a) reacting the fatty acid methyl esters derived from an oil selected from the group consisting of *Sterculia foetida,* cottonseed, and *Hibiscus syriacus,* in a nitrogen atmosphere with about a 0.02 weight percent to about a 0.50 weight percent of a palladium catalyst selected from the group consisting of palladium on carbon, palladium on silica, and palladium black for a period of about from 1 to 3 hours at a temperature of about from 150° to 200° C.,
   (b) cooling the reaction mixture, and
   (c) removing the palladium catalyst.

References Cited

UNITED STATES PATENTS

| | | | |
|---|---|---|---|
| 3,201,431 | 8/1965 | Merker et al. | 260—409 |
| 3,347,886 | 10/1967 | Rayner et al. | 260—424 |

LEWIS GOTTS, Primary Examiner

E. G. LOVE, Assistant Examiner

U.S. Cl. X.R.

260—409